United States Patent [19]

Howard

[11] Patent Number: 4,708,554
[45] Date of Patent: Nov. 24, 1987

[54] STRUT

[76] Inventor: William A. Howard, 710 El Capitan Dr., Danville, Calif. 94526

[21] Appl. No.: 721,221

[22] Filed: Apr. 8, 1985

[51] Int. Cl.⁴ ............................................. F16B 37/00
[52] U.S. Cl. ...................................... 411/84; 411/437; 52/710
[58] Field of Search .................. 411/84, 85, 437, 427, 411/918; 403/363; 52/710, 720, 738; 248/68.1, 69

[56] References Cited

U.S. PATENT DOCUMENTS

| | | | |
|---|---|---|---|
| 1,405,994 | 2/1922 | Fisher | 52/710 |
| 1,758,150 | 5/1930 | Elston | |
| 1,779,346 | 10/1930 | Trachte | 411/918 X |
| 2,020,062 | 11/1935 | Jackson | 72/118 |
| 2,909,054 | 10/1959 | Phillips | 72/105 |
| 3,261,357 | 7/1966 | Roberts | 411/918 X |
| 3,830,033 | 8/1974 | Gahler | 52/720 |
| 4,130,977 | 12/1978 | Taylor | 52/738 X |
| 4,185,802 | 1/1980 | Myles | 248/68.1 X |
| 4,516,296 | 5/1985 | Sherman | 411/378 X |
| 4,542,871 | 9/1985 | Fortsch | 248/68.1 |

FOREIGN PATENT DOCUMENTS 239504 4/1965 Austria ................................ 52/710

OTHER PUBLICATIONS

Elcen Metal Products Company, *Channel Framing and Fittings Electrical Raceway and Accessories*, Jul. 1982.
Metal Framing Manufacturers Association, *Metal Framing Standards Publication*, 1984, p. 1.

Primary Examiner—Gary L. Smith
Assistant Examiner—Adrian H. Whitcomb, Jr.
Attorney, Agent, or Firm—Kathleen A. Skinner

[57] ABSTRACT

An elongated strut which has a pair of inwardly depending flanges formed to receive and secure fittings inserted into the continuous slot of the strut anywhere along the length of the slot. The flanges define an interior cavity to receive and hold strut fittings and accessories.

12 Claims, 7 Drawing Figures

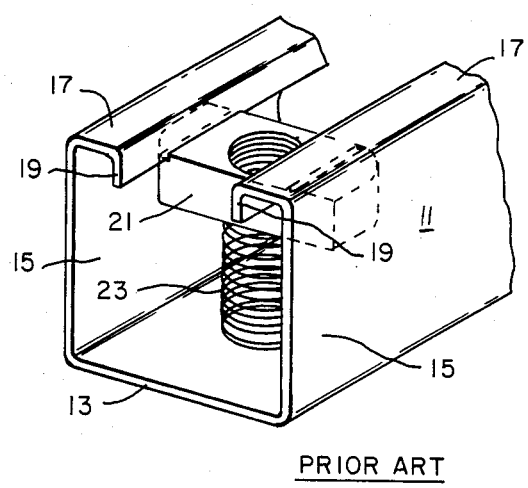
FIG.—1 PRIOR ART
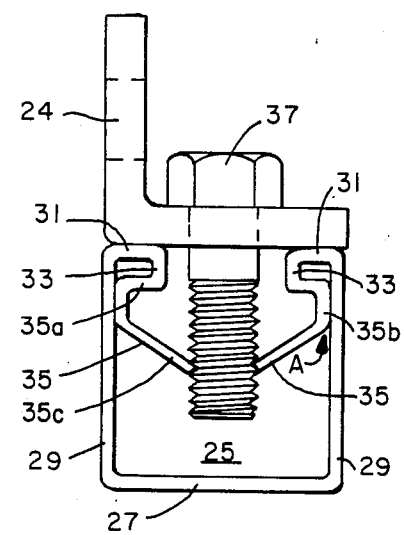
FIG.—2
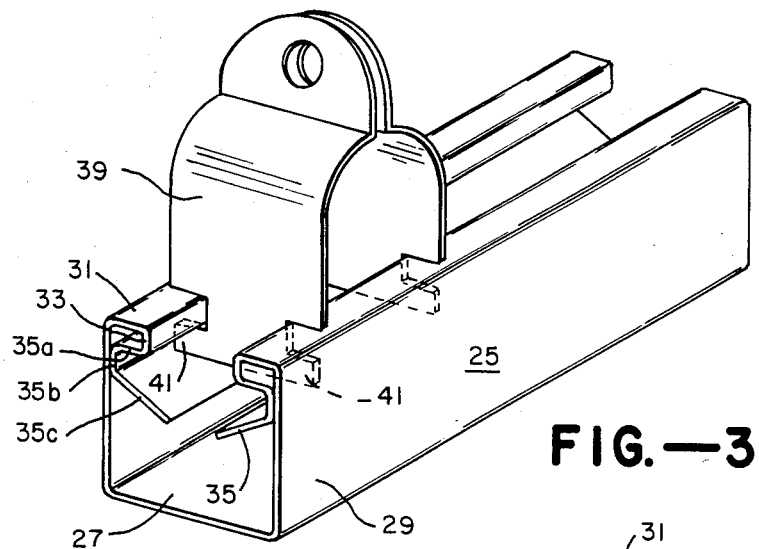
FIG.—3
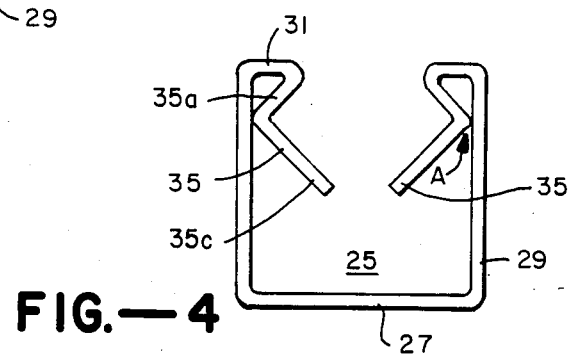
FIG.—4

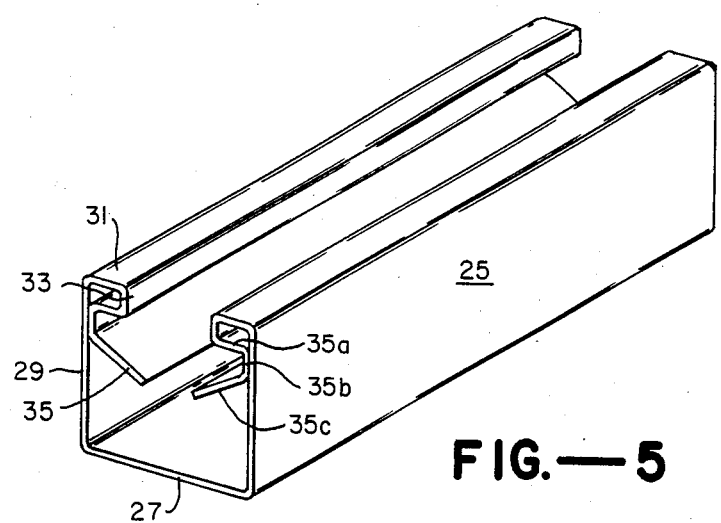
FIG.—5
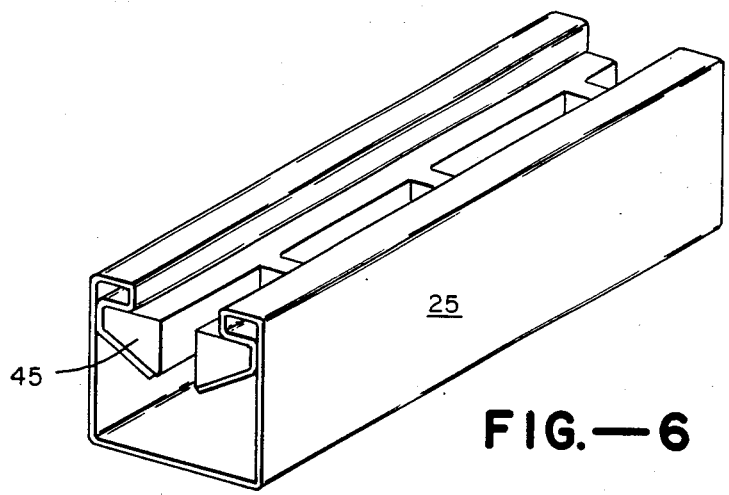
FIG.—6
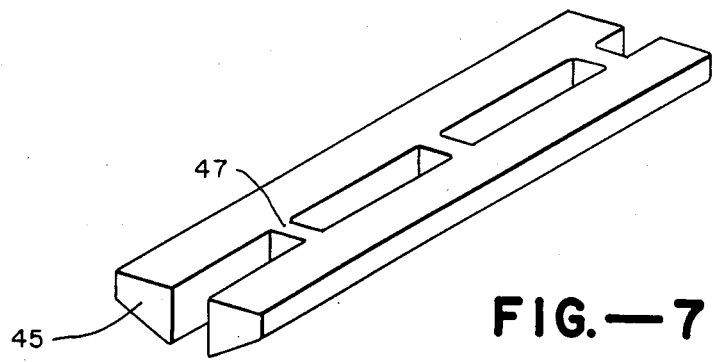
FIG.—7

STRUT

BACKGROUND OF THE INVENTION

1. Field of the Invention

The present invention relates to framing structures for the support of conduit, fixtures, piping and other equipment and accessories used in process piping, plumbing, heating, cooling and electrical systems of buildings and other industrial and commercial applications and particularly, to an improvement in strut which is the primary component of structures that support such systems.

2. Description of the Prior Art

"Strut" is a structural member defined in metal framing construction industry as continuous slot channel with inturned lips. Strut has been widely used since World War II as a framing member in buildings for supporting fixtures and equipment, piping, conduit, etc. needed for the operational systems of commercial buildings, refineries, power plants, and other industrial and commercial applications. The strut support system may be either attached to the building structure or independent of it, thus making it useful also in a number of industrial applications where freestanding support structures are needed. Metal strut, which can be cold rolled from steel or extruded from aluminum into a variety of sizes and lengths, is a stronger framing member than wood and more versatile than welded construction because it requires only hand tools for assembly and, unlike welded structures or framing, can be disassembled.

Strut can be used effectively in both vertical and horizontal orientations and numerous accessories and fittings are available for connecting framing members or anchoring equipment to the strut. One such typical fitting, a spring nut, is shown in FIG. 1 of the accompanying drawings. The spring nut is usually rectangular in shape with two opposing beveled corners and parallel grooves along the narrower edges, so that it may be inserted anywhere along the slot of the strut and then turned 90° to clamp onto the inside edges of the strut. A spring is attached to the underside of the nut to hold it in position while bolts are inserted into the nut to anchor various fittings, connectors, brackets, etc., to the strut. Although time-consuming, this procedure is relatively simple when the first connectors and fittings are attached to the strut. However, as more joints and fittings are mounted to the slot of the strut, the strut becomes more congested and correspondingly, it becomes more difficult and even more time-consuming to add or remove a nut or other fitting.

The present invention is an improved form of strut which overcomes this drawback in the prior art and maximizes the usefulness and versatility of strut. The present invention is designed to allow attachments to be mounted to the strut without the use of nuts, thereby saving time in assembling and repositioning attachments. The elimination of the need for nuts and spring nuts also provides savings by reducing the parts and materials needed in inventory during construction projects. This invention makes it possible to attach fittings more easily in crowded areas of the structure, thus maximizing the potential number of attachments which can be made. The strut of this invention is designed so that it can be cold rolled by a continuous process, or extruded, in a manner similar to that used to make prior art strut. Since the present invention has the same outer configuration as the strut of the prior art and can be used with all the same accessories and attachments, it may be utilized interchangeably with current systems and standard fittings. Thus, the new form of strut of this invention, which eliminates the need for nuts, has all the advantages and uses of conventional strut and is compatible with existing strut and accessories, while providing additional advantages of increased versatility and reduced construction costs and inventory requirements.

SUMMARY OF THE INVENTION

The present invention is an improved elongated strut in which inwardly depending flanges disposed at the lips of the strut are formed to receive and secure fittings without the use of nuts.

OBJECTS OF THE INVENTION

It is therefore an important object of the invention to provide strut which eliminates the need for nuts in mounting attachments thereto, but yet allows the use of standard fittings.

It is another object of the invention to provide strut which may be manufactured in various lengths and shapes by standard cold roll or extrusion methods.

It is a further object of the invention to provide strut which makes it possible to reduce labor and inventory costs in construction of strut systems.

It is yet another object of the invention to provide strut which can accommodate more fittings and attachments than conventional strut.

Other objects and advantages of the invention will become apparent when it is considered in conjunction with the accompanying drawings described hereafter.

DESCRIPTION OF THE DRAWINGS

FIG. 1 is a perspective view of a portion of strut of the prior art showing a typical spring nut mounted therein.

FIG. 2 is a side elevational view of one embodiment of the strut of this invention, shown with typical fastening members mounted thereto.

FIG. 3 is a perspective view of the embodiment shown in FIG. 2, shown with a clamp of the prior art attached thereto.

FIG. 4 is a side elevational view of another embodiment of this invention.

FIG. 5 is a perspective view of the embodiment of the invention shown in FIG. 2.

FIG. 6 is a perspective view of another embodiment of this invention.

FIG. 7 is a perspective view of the optional alignment means shown in FIG. 6.

DESCRIPTION OF THE PRFERRED EMBODIMENT

The present invention is an improved form of strut for use in constructing support structures for various purposes, including freestanding structures and structures used in the interior of buildings to support building fixtures and the components of operational systems of the building.

The strut of the prior art, illustrated in FIG. 1, is typically an elongated channel 11, which has a back wall 13 and side walls 15. Inturned lips 17, which may have downturned portions 19, are disposed on the top of the strut, forming a continuous slot between them. Various fittings,such as th spring nut 21 shown in FIG.

1, can be inserted into the slot and then anchored in place with bolts or the like. Usually the spring 23 of the spring nut is needed to hold the nut in place along the slot while other fittings, such as the connector 24 shown in FIG. 2, are bolted to the top of the strut. It can be appreciated that it would be very time-consuming to retrieve or reposition a nut that falls into the interior of the strut some distance from the end of the strut.

The elongated strut 25 of the present invention has an outer configuration similar to that of the strut 11 of the prior art; that is, it has a back surface 27, two side surfaces 29, and a continuous slot bounded by inturned lips 31, which may have downturned ends 33.

The elongated strut 25 of the present invention also has inwardly depending flanges 35 formed to receive and secure fittings inserted into the slot of the strut. In the preferred embodiment of this invention, the flanges are disposed generally continuously along the length of the slot, thereby allowing insertion of the fittings, such as a standard bolt 37, anywhere along the slot. The flanges project generally toward the back surface 27 of the strut and toward each other. Generally, a number of different configurations of the inwardly depending flanges could effectively receive and secure bolts or other threaded fittings inserted into the slot of the strut. For example, the flanges 35 could be disposed, as illustrated in FIG. 4, at lips 31 with upper portions 35a angled downwardly away from each other and then angled toward each other and toward the back surface of the strut, forming somewhat V-shaped flanges which allow a fitting to be inserted between them.

In the preferred embodiment of this invention, the upper portions 35a of the inwardly depending flanges 35 depend from the lip portions 31 or 33, of the elongated strut 25 whereby they form generally horizontal shelves proximate the continuous slot of the strut. Generally, the flanges project away from the ends of the lips toward the inner surfaces of the sides of the strut to form opposing shelves at the top of the strut on each side of the continuous slot. Each shelf is substantially parallel to the back wall 27 of the strut. The upper portions 35a of the flanges are disposed below and may be substantially parallel to the top surfaces 31 of the lips of the strut or they may be angled relative to the top surfaces of the strut. The thickness and configuration of the shelves formed by the upper portions 35a of the flanges with the lips of the strut can be varied, depending on manufacturing preferences and other factors. The height of the downturned portions 33 of the lips of the strut could also be varied or eliminated as illustrated in FIG. 4. The shelves can be used to anchor and retain certain fittings which are not mounted to the strut with nuts and bolts, such as a standard pipe clamp 39. A typical pipe clamp has matching notches on each side of each clamp-piece near the ends 41. These are attached to the strut, as shown in FIG. 3. The shelves formed near the top of the strut 25 in one embodiment of this invention mate with the notched ends 41 of the clamps 39 and secure the clamps or similar fittings in the continuous slot. If the configuration of the embodiment shown in FIG. 4 is preferred for manufacturing advantages, the clamps can be stamped with larger notches allowing the projections 41 on the ends of the clamp to be secured in the strut below the ends of the flanges 35.

In the preferred embodiment of this invention, inner portions 35b of the inwardly depending flanges 35 are disposed below the shelves proximate the inner surfaces of the side walls 29 of the strut and the ends 35c of the flanges project away from the side walls toward the opposing flange. The inwardly depending flanges 35 define an interior cavity which, at its widest point, is wider than the width of the continuous slot of the strut. The width of the slot referred to is the distance between the end of one lip 31 of the strut to the end of the other lip 31. In the preferred embodiment it is important that the distance between the ends 35c of the flanges be smaller than the width of the slot of the strut. Although portions 35b of the flanges are closer to the side walls than to the slot they need not be in contact with the side walls, nor need these inner portions 35b be any particular length. The actual configuration of the interior cavity formed by the flanges can also vary considerably, but it is preferred in one embodiment that the interior cavity defined by the flanges have a configuration to accommodate a generally rectangular member, such as the end portions 41 of a clamp 39.

In the preferred embodiment, the ends 35c of the flanges 35 are angled toward the back surface 27 of the strut 25 and toward each other. In the preferred embodiment, the end portions 35c of the flanges are disposed downwardly from the slot in reciprocal configuration so that the threaded end of a standard bolt 37 can be inserted between the ends of the flanges and the bolt will be secured against upward movement. Generally, the end portions of the flanges are angled away from the side surfaces 29 downwardly toward the back surface 27 of the strut, forming an angle A which will be less than 90°.

In this invention, the inwardly depending flanges 35 are integrally connected to the inturned lips 31 or the downturned portions 33 of the lips of the elongated strut 25 and the upper portions 35a, inner portions 35b and end portions 35c of the flanges are integrally connected to each other. Preferably, the strut and the flanges are formed from a continuous piece of material. Thus, the elongated strut of this invention can be cold rolled from steel by the same process as that used for strut of the prior art, by making suitable changes in the roll process to accommodate the additional bends of the strut of this invention. The bends in the flanges of the invention can be more rounded or squared, or abrupt or angled than illustrated in FIG. 2 or FIG. 4. Similarly, the portions of the flanges which are shown as straight in the accompanying drawings could be curved or angled differently. It would also be possible to taper the ends of the inwardly depending flanges of this embodiment to allow them to grasp the threaded portions of the bolt more easily and more securely, if desired.

It is also expected that the strut 25 of this invention can be made by other processes, such as extrusion, and out of other materials if desired. Obviously, the length of any particular piece of strut is limited only by practicalities of the manufacturing process. The elongated strut of this invention can also be manufactured in any of the standard variations in configuration of conventional strut: for example, the strut can have longer or shorter side walls; it could be crimped for additional strength, it could be mounted back-to-back with one or more other pieces of strut for additional strength and versatility.

In another embodiment of this invention, the elongated strut 25 further comprises removable alignment means 45 disposed within the interior cavity defined by the flanges 35. This alignment means, which facilitates the insertion and positioning of the threaded member 35 until it reaches the gripping ends 35c of the flanges, consists of an insert made from compressible material and formed to fill at least a portion of the interior cavity defined by the flanges. The insert could be made from neoprene, for example, which could be extruded and inserted into the elongated strut at the time of manufacture. The insert 45 should have a shape which fits easily into the cavity formed by the flanges 35 of the elongated strut 25 and also has a groove or slot for receiving and aligning fittings inserted into the slot of the strut until they are caught by the ends 35c of the flanges 35. The insert 45 could consist of opposing portions which substantially fill the cavities below the shelves formed by the flanges so that the opposing portions are connected at intervals by bridges 47 which hold the insert in place but provide grooves aligned with the continuous slot along its length. It can be seen that the alignment means thus further improves the ease of assembly and attachment of connectors and fittings to the strut. The material used in making such a filler could also be chosen to provide sound insulation in certain applications.

Thus, this invention is an improved form of strut which eliminates the need for nuts for threaded fittings and attachments, yet can also be used for notched fittings. This invention provides an opportunity for substantial labor savings because it facilitates the assembly of fittings and connections to the strut, increases the number of fittings which can be attached to the strut, and allows for the reduction of inventory requirements, while still being compatible with existing systems and attachments and being capable of being manufactured by conventional processes. This invention thus increases the versatility and advantages of strut as a building component and reduces the time and difficulty of making certain attachments to strut in the process of assembly, modification or disassembly of a strut structure.

It will be seen that the above-described strut will achieve all the advantages and objects attributed to it and while it has been described in detail, it is not intended to be limited to such details except as may be necessitated by the appended claims.

I claim:

1. An elongated strut having inwardly depending flanges disposed generally continuously along the length of the slot of said strut, said flanges being formed to receive and secure fittings inserted into the slot of said strut, wherein portions of said flanges depend from the lips of said strut and form opposing shelves at the top of the strut proximate the continuous slot of the strut and said inwardly depending flanges define an interior cavity with a cross-section having at its widest point a width greater than the width of the continuous slot of said strut and wherein the ends of said flanges project generally towards each other.

2. The elongated strut of claim 1 wherein said strut and said inwardly depending flanges are formed from a continuous piece of material.

3. The elongated strut of claim 1 further comprising removable alignment means disposed within the interior cavity defined by the flanges.

4. The elongated strut of claim 3 wherein said alignment means comprises an insert made from compressible material and formed to fill at least a portion of the interior cavity defined by the flanges.

5. An elongated strut having a generally flat back wall, side walls parallel to each other at least at the top section thereof, inturned lips from said side walls, and a continuous slot along the length of said strut between said lips, said elongated strut also having inwardly depending flanges disposed generally continuously along the length of said slot, said flanges formed to receive and secure fittings inserted into said slot and engaged with said flanges, whereby said fittings are removably secured by said flanges inside said strut and a first portion of each of said inwardly depending flanges projects generally toward the interior side wall of the strut adjacent to said flange and an end portion of each flange projects generally toward the interior back wall of the strut and toward the other flange wherein said inwardly depending flanges define an interior cavity with a cross-section having at its widest point a width greater than the width of the continuous slot of said strut.

6. The elongated strut of claim 5 wherein the upper portions of said inwardly depending flanges depend from the lips of said strut whereby opposing shelves are formed on the interior of the strut at the top thereof proximate the continuous slot of the strut.

7. The elongated strut of claim 5 or 6 wherein the distance between the ends of said flanges is smaller than the width of the continuous slot of the strut.

8. The elongated strut of claim 7 wherein said strut and said inwardly depending flanges are formed from a continuous piece of material.

9. An elongated strut having parallel side walls, a generally flat back wall and a pair of opposing flanges depending inwardly from the lips of said strut along the length of the continuous slot of said strut wherein the upper portions of said flanges are disposed in the interior of the strut below the top surface of the lips of the strut, and the end portions of said flanges are angled away from the side walls of the strut toward each other and toward the back wall of the strut whereby said inwardly depending flanges define an interior cavity with a cross-section having at its widest point a width greater than the width of the continuous slot of said strut, said inwardly depending flanges having a configuration to removably secure a generally rectangular member.

10. The elongated strut of claim 5 or 9 wherein the end portions of said flanges removably engage the threaded portion of a fastener inserted therebetween and secure said fastener in a selected position anywhere along the slot of said strut.

11. The elongated strut of claim 7, 9 or 10 having removable alignment means disposed within the interior cavity defined by the flanges.

12. The elongated strut of claim 11 wherein said alignment means comprises an insert made from compressible material and formed to fill at least a portion of the interior cavity defined by the flanges and having a groove disposed beneath the continuous slot of said strut for receiving and securing fittings.

* * * * *